United States Patent [19]

Schenkel

[11] Patent Number: 5,331,326
[45] Date of Patent: Jul. 19, 1994

[54] CORRECTING ERRORS IN CROSSFEED RADAR SYSTEMS

[75] Inventor: Albert Schenkel, Zurich, Switzerland

[73] Assignee: Siemens-Albis AG, Zurich, Switzerland

[21] Appl. No.: 631,982

[22] Filed: Dec. 21, 1990

[30] Foreign Application Priority Data

Dec. 22, 1989 [CH] Switzerland ............ 04606/89-3

[51] Int. Cl.⁵ ............................................. G01S 13/44
[52] U.S. Cl. .................................... 342/148; 342/152
[58] Field of Search ............................... 342/148, 152

[56] References Cited

U.S. PATENT DOCUMENTS 4,084,160 4/1978 Leuenberger et al. ............ 342/147
4,219,816 8/1980 Schenkel et al. .
4,449,127 5/1984 Sanchez ........................ 342/147 X

FOREIGN PATENT DOCUMENTS 592887 11/1977 Switzerland .
629898 5/1982 Switzerland .

OTHER PUBLICATIONS

Barton, "Low-Angle Radar Tracking", Proceedings IEEE vol. 62, No. 6, Jun. 1974, pp. 687-704.
Merrill Skolnik, "Radar Handbook", McGraw-Hill, Inc., 1970, pp. 26-34.

Primary Examiner—Gilberto Barrón, Jr.
Attorney, Agent, or Firm—Sandler Greenblum & Bernstein

[57] ABSTRACT

A method for correction errors in radar systems that operate using a crossfeed principle (CFR), in which echo signals are directly received from flying objects, such as an aircraft. In particular, the present invention is used in connection with low-flying objects, in which radar signals are indirectly reflected from the surface of the earth to an antenna of the radar system. Correction terms are determined and weighted, using correction factors, so as to improve the capability of the crossfeed radar system to accurately determine the exact elevation of the flying object. The correction factors that are used to improve the accuracy of the radar system are based upon sea state numbers, or Beaufort numbers, which vary in relation to the shape and/or structure of the reflecting surface.

26 Claims, 1 Drawing Sheet

CORRECTING ERRORS IN CROSSFEED RADAR SYSTEMS

BACKGROUND OF THE INVENTION

1. Field of the Invention

The present invention pertains to a method for correcting errors that occur during the use of Crossfeed Radar (CFR) equipment that operates in accordance with a crossfeed principle and which receives echo signals from flying objects. In particular, the present invention is used in connection with echo signals that are emitted by a low-flying object, such as an aircraft, and are reflected from a surface of the earth.

2. Discussion of Background and Relevant Information

Monopulse tracking radar equipment is normally used to track airborne objects, such as an aircraft. Such a system purposely generates azimuth and elevation error signals which, when transmitted in open space, cancel out azimuth and elevation errors if the transmitting antenna, or boresight axis, is directly aligned with a desired target. An antenna guidance system, using two servo circuits, is typically employed for tracking a target. One servo circuit controls the elevation of the antenna, while the second servo circuit controls the azimuth adjustment of the antenna.

Unfortunately, an elevation angle error occurs when a transmitted signal "hits", for example, a body of water, and is echoed back to the antenna. This results in a non-zero elevation angle indication that can not be eliminated, even if the axis of the antenna is aligned directly with the target. Thus, in addition to receiving the desired echo signal from the tracked target, a second, undesired, target echo signal, reflected from the surface of the water (or ground), is received. The radar system cannot discriminate between the first, desired echo signal and the second, undesired echo signal with regard to the distance or bearing. Thus, the superimposition of these two echo signals results in an erroneous indication of the elevation of the target. The result is that during the guidance tracking phase, the elevation servo circuit orients the antenna axis away from the target.

Additional bearing error signals have been utilized in a so-called crossfeed method in an attempt to overcome the above-discussed deficiency of the monopulse tracking system. If the right combination of signals is used, a zero position signal on the antenna axis will be generated. Such a method is described in, for example, Swiss Letters Patent Nos. 592,887 and 629,898. According to these patents, a monopulse antenna with, for example, four antenna horns a, b, c, d is used. The antenna horns receive an interference signal, consisting of a direct echo signal and a reflected echo signal. From the echo signals received by the antenna horns a, b, c and d, a summing/differentiation circuit located downstream obtains the following signals which depend upon the alignment of the antenna with respect to the target and to the reflecting surface:

$$F_S = a+b+c+d, \quad (1)$$

where $F_S$ comprises a summing function containing the distance information $$F_{dA} = d-b, \quad (2)$$

where $F_{dA}$ comprises a first differentiation function containing lateral or azimuth bearing information $$F_{dE} = a-c, \quad (3)$$

where $F_{dE}$ comprises a second differentiation function that is distorted by reflection effects, and which contains an elevation angle or elevation information and reflection effect information $$F_{dK} = (a+c)-(b+d), \quad (4)$$

where $F_{dK}$ comprises a cross-term function that contains both bearing data and reflection effect information.

These functions are processed in accordance with the radar system, in reference to the summing function $F_S$ in a discriminator that is located downstream of the summing/differentiation circuit. This results in the production of three signals:

Azimuth angle signal $F_A = F_{dA}/F_S$;
Elevation angle signal $F_E = F_{dE}/F_S$; and
Crossterm signal $F_K = F_{dK}/F_S$.

In adjacent quadrature channels, the in-phase portions EAP, EEP and EKP of the bearing error functions $F_A$, $F_E$, and $F_K$ and the quadrature portions EEQ and EKQ which are displaced by 90 degrees with respect to the corresponding in-phase portions EEP and EKP, are obtained. The summing function $F_S$, or a signal corresponding to it, is valid as a reference for all bearing error signals.

A corrected elevation angle error signal $F_{Ekorr}$ is obtained as a function of the angle between the target and the antenna axis $w_{dE}$ from the function:

$$F_{Ekorr}(w_{dE}) = EEP - (EEQ/EKQ) \cdot EKP + (EEQ/EKQ) \cdot F_K(w_{dE})$$

or $$F_{Ekorr}(w_{dE}) = EEP + FD1 + FD2$$

In contrast to correction term FD1 itself, remainder correction term FD2 is a function of angle $w_{dE}$ and is iteratively determined, or is disregarded. Error correction in accordance with the described method operates satisfactorily as long as the reflection echo signal is reflected to the antenna from only one place on the surface of the earth. However, multiple, or diffuse reflections, directed towards the receiver antenna often occur, which cannot be corrected at all, or can only be partially corrected by the above-described method.

SUMMARY OF THE INVENTION

Accordingly, it is an object of the present invention to develop a method to correct for reflecting errors, which results in an improved correction of the elevation angle error signal in the case of multiple, or diffuse, reflections.

The object of the present invention is achieved by obtaining correction terms that are weighted with factors that are a function of a shape and/or structure of the reflecting surface, or, alternatively, parameters that are connected with the shape and/or structure of the reflecting surface.

According to the present invention, a method is disclosed in which a crossfeed radar system is capable of tracking flying objects, such as low-flying objects, over water in spite of various wave conditions that would affect the accuracy of conventional radar systems, and over land in spite of various degrees of roughness of the terrain that also affect the accuracy of conventional radar systems.

According to an object of the present invention, a method is disclosed for improving the accuracy of radar equipment operating in accordance with a crossfeed principle, in which echo signals are directly received from flying objects and indirectly received from reflections from a surface of the earth, comprising the step of weighting a correction term with a correction factor that is a function of a characteristic of the reflecting surface of the earth.

An advantage of the present invention is that the step of weighting the correction term with a correction factor comprises the steps of weighting a first correction term with a first correction factor and weighting a second correction term with a second correction factor. If the second correction term is to be disregarded, the second correction factor is set to 0. However, if the second correction term is used, the second correction factor is set to correspond to the value selected for the first correction factor.

Another advantage of the present invention is that the correction factor is a function of a sea state when echo signals are reflected from the surface of a body of water.

Another advantage of the present invention rests with the recognition that there is a relationship between wind speed and the roughness of a body of water, so that the correction factor can be based upon wind speed.

Another advantage of the present invention is that the correction factor can be determined by measuring an object that has a known elevation, when the surface of the body from which indirectly reflected echo signals come from have an unchanging roughness. In addition, a plurality of correction factors can be used that correspond to a plurality of different roughnesses of the surface of the body.

Another object of the present invention is to improve the accuracy of radar equipment operating in accordance with a crossfeed principle, by receiving echo signals that are indirectly reflected from a surface of a body, such as the earth, and calculating a corrected elevation angle error signal $F_{Ekorr}$ according to the equation:

$$F_{Ekorr}(w_{dE}) = EEP + k1 \cdot FD1 + k2 \cdot FD2$$

where $w_{dE}$ comprises an angle axis of an antenna of the radar equipment; EEP comprises an in-phase portion of a signal associated with the radar equipment; k1 comprises a first correction factor that weights a first correction term FD1; and k2 comprises a second correction factor that weights a second correction term FD2.

An advantage of the present invention is that the correction factor is a function of a sea state when indirectly reflected echo signals are reflected from the surface of a body of water.

Another advantage of the present invention rests with the recognition that there is a relationship between wind speed and the roughness of a body of water, so that the correction factor can be based upon wind speed.

Another advantage of the present invention is that the correction factor can be determined by measuring an object that has a known elevation, when the surface of the body from which indirectly reflected echo signals come from have an unchanging roughness. In addition, a plurality of correction factors can be used that correspond to a plurality of different roughnesses of the surface of the body.

BRIEF DESCRIPTION OF THE DRAWINGS

The foregoing and other objects, features and advantages of the present invention will be apparent from the following more particular description of the preferred embodiments, as illustrated in the accompanying drawings, in which reference characters refer to the same parts throughout the drawings, and wherein.

DETAILED DESCRIPTION OF THE PREFERRED EMBODIMENTS

The present invention is related to Swiss Application No. 04 606/89-3, which is expressly incorporated herein in its entirety.

Figure 1:
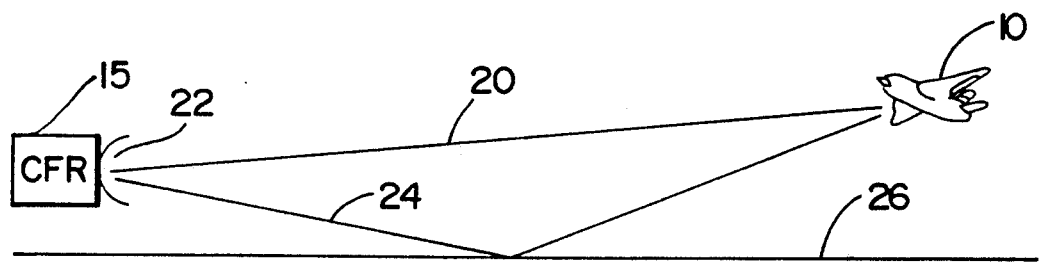
FIG. 1 illustrates a path of echo signals from an airborne object to a radar antenna under ideal reflecting conditions.

FIG. 1 illustrates a low-flying object 10, such as an aircraft, that is scanned by a crossfeed radar (CFR) system 15. In addition to a directly reflected echo signal 20, radar antenna 22 also receives an echo signal 24 that is reflected from a surface 26 of the earth. FIG. 1 illustrates an example in which the surface 26 of the earth is smooth. Thus, only a single, non-diffuse, reflected echo signal arrives at the antenna 22. Conventional crossfeed radar systems that receive an echo signal from a smooth surface, as illustrated in FIG. 1, generally have no difficulty in determining an exact elevation of the flying object 10.

Figure 2:
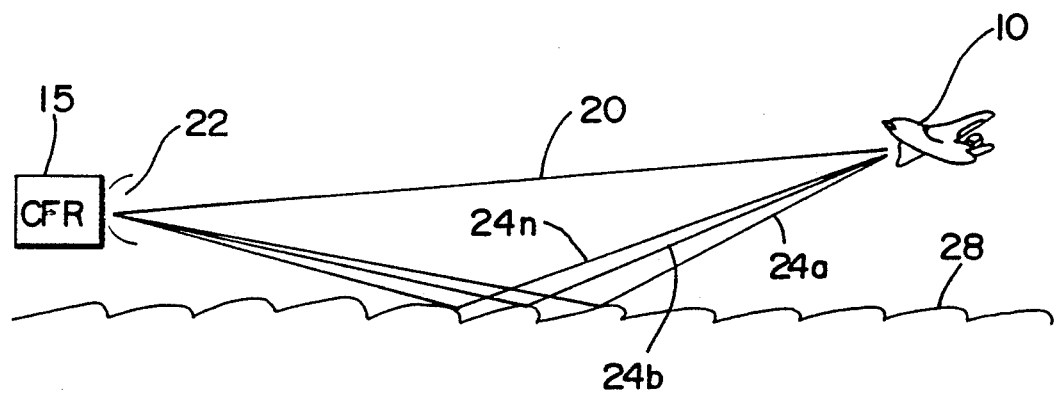
FIG. 2 illustrates a path of echo signals from the airborne object to the radar antenna under difficult reflecting conditions.

However, conventional crossfeed radar systems have difficulty determining an exact elevation of a flying object when reflected echo signals bounce off of a rough surface. As illustrated in FIG. 2, echo signals 24a–24n are reflected off of a rough surface 28 of the earth. In this example, a conventional crossfeed radar system can only determine the elevation of the flying object 10 with a limited degree of accuracy.

According to a preferred embodiment of the present invention, weighting correction terms FD1 and FD2 are determined using correction factors k1 or k2, which vary in dependence of the roughness of the terrain. The use of the correcting factors k1 and k2 improves the measuring accuracy of the crossfeed radar system, i results in a higher accuracy of the corrected elevation angle error signal $F_{Ekorr}$. According to the present invention, the corrected elevation angle error signal $F_{Ekorr}$ is formed according to the following equation:

$$F_{Ekorr}(w_{dE}) = EEP + k1 \cdot FD1 + k2 \cdot FD2$$

In the case where the echo signals 24a–24n reflect off surface of water, the correction factors k1, k2 are determined corresponding to the height of the waves of the water. Correction term FD2 provides only a minor improvement and can usually be disregarded in current crossfeed radar systems because it can only be, with great effort, iteratively determined. Therefore, in most applications, the correction factor k2 is set to zero. However, if the correction term FD2 is employed, correction factor k2 corresponds to the value of correction factor k1. In particular, the best results are obtained when k1 and k2 are equally weighted; that is, k1 is equal to k2. The values for correction factor k1 correspond to the appropriate wave heights, or to sea state numbers. Sea state numbers are recited on page 26-4 of "Radar Handbook", by Merrill Skolnik, and published by McGraw-Hill, Inc., 1970, which is incorporated by reference. Correction factor k1 should be selected as follows:

For sea state numbers 0 and 1 (indicating calm, smooth waters), k1 is selected to be approximately equal to 1, or equal to 1. For sea state numbers 6-9 (indicating high waves, very high waves, etc.), correction factor k1 approaches 0. Optimization of these values, and the selection of the values for sea state numbers 2 to 5 takes place during equipment testing, by measuring an object with known position data. For example, correction factor k1 (where k1 is less than or equal to 1, but greater than 0) is reduced by 5 to 10 percent for each next-higher sea state number.

A second embodiment of the present invention is based upon a realization that there is a direct relationship between the wave height of the waters and wind speed. According to this embodiment, correction factor k1 is determined as a function of wind speed. The values for correction factor k1 corresponding to appropriate wind speeds, or Beaufort numbers, are also found on page 26-4 of the "Radar Handbook". Correction factor k1 is selected as follows:

For Beaufort numbers 0 and 1 (indicating calm, light air), k1 is selected to be approximately equal to 1, or equal to 1. For Beaufort numbers 9-12 (indicating strong winds, gale winds, storm, etc.), correction factor k1 approaches 0. Optimization of these values, and the selection of the values for Beaufort numbers 2-8, takes place during equipment testing, by measuring an object with known position data. For example, correction factor k1 (where k1 is less than or equal to 1, but greater than 0) is reduced by 2.5 to 10 percent for each Beaufort number.

According to the present invention, a crossfeed radar (CFR) system that receives echo signals reflected from surfaces having a roughness that does not change over a period of time (such as, for example, cultivated fields, meadows, woods, etc.), can have the selection of the value for correction factor k1 empirically made during the course of testing the radar equipment, by measuring an object with known position data. Furthermore, the method of the present invention can be used to select the most favorable correction factor k1 for each sector of varied roughness in which the radar system is to operate. Thus, the method according to the present invention permits the determining of an exact elevation of the flying object 10.

While the present invention has been particularly shown and described with reference to preferred embodiments thereof, it is understood by those skilled in the art that various alterations in form and detail may be made without departing from the spirit and scope of the invention, as defined by the following claims.

What is claimed is:

1. A method for improving the accuracy of radar equipment operating in accordance with a crossfeed principle, in which echo signals are directly received from flying objects and indirectly received from reflections from a surface of the earth, comprising the steps of:

weighting a first correction term with a first correction factor; and weighting a second correction term with a second correction factor, in which the second correction factor corresponds with a value selected for the first correction factor.

2. The method of claim 1, wherein the step of weighting the second correction term with a second correction factor comprises the step of setting the second correction factor to be equal to 0 when the second correction term is to be disregarded.

3. The method of claim 1, wherein the step of weighting the correction terms with correction factors comprises the step of selecting the correction factors that are a function of a sea state when the indirectly reflected echo signals are reflected from the surface of a body of water.

4. The method of claim 1, wherein the step of weighting the correction terms with correction factors comprises the step of selecting correction factors that are a function of wind speed when the indirectly reflected echo signals are reflected from the surface of a body of water.

5. The method of claim 1, wherein the step of weighting the correction terms with correction factors comprises the step of using correction factors that are determined by measuring an object that has a known elevation when the surface of the earth from which the indirectly reflected echo signals come from have an unchanging roughness.

6. The method of claim 5, wherein the step of measuring an object that has a known elevation is performed for a plurality of sectors of the surface of the earth, the plurality of sectors corresponding to a plurality of roughnesses of the surface of the earth.

7. The method of claim 1, further comprising the step of determining an elevation of flying objects as a function of the weighted correction terms.

8. A method for improving the accuracy of radar equipment operating in accordance with a crossfeed principle, in which echo signals are directly received from flying objects and indirectly received from reflections from a surface of the earth, comprising the step of:

weighting a correction term with a correction factor that is a function of a characteristic of the reflecting surface of the earth, comprising the steps of:

weighting a first correction term with a first correction factor; and weighting a second correction term with a second correction factor by setting the second correction factor to correspond with a value selected for the first correction factor.

9. A method for improving the accuracy of radar equipment operating in accordance with a crossfeed principle, comprising the steps of:

receiving echo signals that are directly reflected from a flying object;

receiving echo signals that are indirectly reflected from a surface of the earth; and calculating a corrected elevation angle error signal $F_{Ekorr}$ according to the following equation:

$$R_{Ekorr}(W_{eE}) = EEP + k1 \cdot FD1 + k2 \cdot FD2$$

where $w_{dE}$ comprises an angle axis of an antenna of the radar equipment; EEP comprises an in-phase portion of a signal associated with the radar equipment; k1 comprises a first correction factor that weights a first correction term FD1; and k2 comprises a second correction factor that weights a second correction term FD2, the second correction factor being selected to correspond with a value selected for the first correction factor.

10. The method of claim 9, wherein the step of calculating the corrected elevation error signal comprises the step of selecting appropriate values for the first and second correction factors according to sea state numbers of a body of water.

11. The method of claim 9, wherein the step of calculating the corrected elevation error signal comprises the step of setting the second correction factor to be equal to 0 when the second correction term is to be disregarded.

12. The method of claim 9, wherein the step of calculating the corrected elevation error signal comprises the step of selecting an appropriate value for a correction factor according to a wind speed.

13. The method of claim 9, wherein the step of calculating the corrected elevation error signal comprises the step of using a correction factor that is determined by measuring an object that has a known elevation when the surface of the earth from which the indirectly reflected echo signals come from have an unchanging roughness.

14. The method of claim 9, wherein the step of measuring an object that has a known elevation is performed for a plurality of sectors of the surface of the earth, the plurality of sectors corresponding to a plurality of roughnesses of the surface of the earth.

15. A method for use with a crossfeed radar system for accurately determining an elevation of a flying object, comprising the steps of:

obtaining a plurality of indirectly reflected echo signals that bounce off of an irregular surface of a body towards an antenna of the radar system;

determining an in-phase portion of a signal associated with the radar system; and modifying the in-phase signal portion with first and second correction factor values that weighted by respective first and second correction terms so as to determine a corrected elevation angle between the flying object and an antenna axis of the radar system, the value of the first and second correction factors being dependent upon the irregularity of the surface, the value of the second correction factor being selected to correspond to a value of the first correction factor.

16. The method of claim 15, wherein the modifying step comprises the step of modifying the in-phase signal according to a sea state number.

17. The method of claim 15, wherein the modifying step comprises the step of modifying the in-phase signal according to a Beaufort number.

18. The method of claim 15, wherein the step of modifying the in-phase signal comprises the step of modifying the in-phase signal by a correction factor that is empirically determined based upon the measuring of an object with known position data that flies over a preselected irregularly shaped surface.

19. The method of claim 16, wherein the modifying step determines the corrected elevation angle between the flying object and the antenna axis of the radar system according to the equation:

$$F_{Ekorr}(w_{dE}) = EEP + k1 \cdot FD1 + k2 \cdot FD2$$

where $F_{Ekorr}$ comprises a corrected elevation angle error signal; $w_{dE}$ comprises an angle axis of an antenna of the radar equipment; EEP comprises the in-phase signal portion; k1 comprises a first correction factor that weights a first correction term FD1; and k2 comprises a second correction factor that weights a second correction term FD2.

20. A method for use with a crossfeed radar system for accurately determining an elevation of a flying object, comprising the steps of:

obtaining a plurality of indirectly reflected echo signals that bounce off of an irregular surface of a body towards an antenna of the radar system;

determining an in-phase portion of a signal associated with the radar system; and modifying the in-phase signal portion with a sea state number so as to determine a corrected elevation angle between the flying object and an antenna axis of the radar system, the value of the sea state number being dependent upon the irregularity of the surface according to the equation:

$$E_{Ekorr}(W_{eD}) = EEP + k1 \cdot FD1 + k2 \cdot FD2$$

where $F_{Ekorr}$ comprises a corrected elevation angle error signal; $w_{dE}$ comprises an angle axis of an antenna of the radar equipment; EEP comprises the in-phase signal portion; k1 comprises a first correction factor that weights a first correction term FD1; and k2 comprises a second correction factor that weights a second correction term FD2 by setting the second correction factor to be equal to 0 when the second correction term is to be disregarded, and setting the second correction factor to correspond with a value selected for the first correction factor when the second correction term is used.

21. A method for use with a crossfeed radar system for accurately determining an elevation of a flying object, comprising the steps of:

obtaining a plurality of indirectly reflected echo signals that bounce off of an irregular surface of a body towards an antenna of the radar system;

determining an in-phase portion of a signal associated with the radar system; and modifying the in-phase signal portion with a correction factor value so as to determine a corrected elevation angle between the flying object and an antenna axis of the radar system, the value of the correction factor being dependent upon the irregularity of the surface according to the invention:

$$E_{Ekorr}(w_{dE}) = EEP + k1 \cdot FD1 + k2 \cdot FD2$$

where $F_{Ekorr}$ comprises a corrected elevation angle error signal; $w_{dE}$ comprises an angle axis of an antenna of the radar equipment; EEP comprises the in-phase signal portion; k1 comprises a first correction factor that weights a first correction term FD1; and k2 comprises a second correction factor that weights a second correction term FD2 by setting the second correction factor to be equal to 0 when the second correction term is to be disregarded, and setting the second correction factor to correspond with a value selected for the first correction factor when the second correction term is used.

22. The method of claim 21, wherein the first and second correction factors are selected according to sea state numbers of a body of water.

23. The method of claim 21, wherein the second correction factor is set to be equal to 0 when the second correction term is to be disregarded.

24. The method of claim 21, wherein at least one of the first and second correction factors is selected according to a wind speed.

25. The method of claim 21, wherein the corrected elevation angle signal comprises using a correction factor that is determined by measuring an object that has a known elevation when the surface of the earth from which the indirectly reflected echo signals come from have an unchanging roughness.

26. A method for improving the accuracy of monopulse radar equipment that operates in accordance with a crossfeed principle, in which echo signals are directly received from flying objects and indirectly received from reflections from a surface of the earth, comprising the steps of:

weighting a first correction term with a first correction factor that is a function of a characteristic of the reflecting surface of the earth; and weighting a second correction term with a second correction factor, wherein the step of weighting the second correction term with a second correction factor comprises the step of setting the second correction factor to correspond with a value selected for the first correction factor.

* * * * *